(12) United States Patent  (10) Patent No.: US 8,850,319 B2
Stoen et al.  (45) Date of Patent: Sep. 30, 2014

(54) METHOD AND SYSTEM TO PROCESS VIDEO EFFECTS

(75) Inventors: Jeffrey Donald Stoen, Palo Alto, CA (US); Churn Wai Ng, Singapore (SG); Willie Png, Singapore (SG)

(73) Assignee: Creative Technology Ltd, Singapore (SG)

( * ) Notice: Subject to any disclaimer, the term of this patent is extended or adjusted under 35 U.S.C. 154(b) by 2743 days.

(21) Appl. No.: 11/345,978

(22) Filed: Feb. 1, 2006

(65) Prior Publication Data

US 2006/0195786 A1   Aug. 31, 2006

Related U.S. Application Data

(60) Provisional application No. 60/649,229, filed on Feb. 2, 2005.

(51) Int. Cl.
```
G06F 3/00      (2006.01)
H04L 12/58     (2006.01)
H04M 3/56      (2006.01)
H04M 7/00      (2006.01)
H04L 12/18     (2006.01)
```

(52) U.S. Cl.
CPC .............. *H04L 12/581* (2013.01); *H04L 51/04* (2013.01); *H04M 7/006* (2013.01); *H04M 2201/50* (2013.01); *H04M 3/567* (2013.01); *H04M 2203/4536* (2013.01); *H04L 12/1813* (2013.01)
USPC ............ 715/723; 715/730; 715/731; 715/704

(58) Field of Classification Search
USPC .................................. 715/723, 730, 731, 704
See application file for complete search history.

(56) References Cited

U.S. PATENT DOCUMENTS

| | | | |
|---|---|---|---|
| 5,703,995 A * | 12/1997 | Willbanks ...................... | 386/52 |
| 6,020,916 A | 2/2000 | Gerszberg et al. | |
| 2001/0034776 A1 * | 10/2001 | Abe et al. ..................... | 709/218 |
| 2003/0189581 A1 * | 10/2003 | Nasoff et al. ................. | 345/660 |
| 2004/0039934 A1 * | 2/2004 | Land et al. .................... | 713/200 |
| 2004/0260669 A1 | 12/2004 | Fernandez | |
| 2005/0143136 A1 * | 6/2005 | Lev et al. ..................... | 455/566 |
| 2006/0075448 A1 * | 4/2006 | McAlpine et al. ............. | 725/105 |
| 2007/0094263 A1 * | 4/2007 | Tessman et al. ............... | 707/9 |

OTHER PUBLICATIONS

Chinese Application No. 2006100592438, Office Action Mailed May 8, 2009, 20 pgs.

(Continued)

*Primary Examiner* — Michael Roswell
(74) *Attorney, Agent, or Firm* — Schwegman Lundberg & Woessner, P.A.

(57) ABSTRACT

A system and method of processing a video Instant Message (IM) is provided. The method may comprise receiving a captured video stream from an image capture device and selecting at least one video effect from a plurality of video effects. A modified video stream is then generated (e.g., using a digital filter) that includes the video effect and is then communicated to a viewing location as the video Instant Message. The IM application can be a legacy IM application and generate a graphic user interface via the IM application to allow a user to select the video effect. The captured video stream may be received from a web camera and the modified video stream may be communicated via the Internet to the viewing location. The method may be performed in a device driver that interfaces the image capture device to an Instant Messaging application associated with the device driver.

29 Claims, 10 Drawing Sheets

(56) References Cited

OTHER PUBLICATIONS

European Application Serial No. 05250549.0, European Search Report mailed Jun. 6, 2006, 6 pgs.

Australian Application Serial No. 2006200425, First Examination Report Mailed Feb. 22, 2010, 2 pages.

Chinese Application Serial No. 200610059243.8, Office Action mailed Sep. 2, 2010, 7 pgs.

* cited by examiner

METHOD AND SYSTEM TO PROCESS VIDEO EFFECTS

CLAIM OF PRIORITY

The present patent application claims the priority benefit of the filing date of U.S. Provisional Application Ser. No. 60/649,229 filed Feb. 2, 2005, the entire content of which is incorporated herein by reference.

TECHNICAL FIELD

The present invention relates generally to the field of processing a captured video stream to include video effects and, more specifically, in one embodiment, to a method and system to process a captured video stream in a device driver.

BACKGROUND

With the advent of the Internet video conferencing or Instant Messaging has become widely available to users having a broadband connection and a personal computer. In computer systems, device drivers are to interface hardware devices to application programs. A driver acts like a translator between a hardware device and an application program (e.g., Microsoft Office) that use the device (e.g., a specific printer). Each hardware device typically has its own set of specialized commands that are known to its dedicated driver thereby to control operation of the device. Likewise, most application programs require access to devices by using generic commands that are not hardware device specific. In order for the application program to utilize generic commands to communicate with the device, the driver accepts generic commands from the application program and translates them into specialized commands understood by the device. Likewise, the device driver may accept specific commands from the device (e.g., ink low in the printer) and translate them into generic commands understood by the application program. Many drivers, such as a keyboard driver, come with an operating system. For other devices, a new driver may need to be loaded when connecting the device to a computer system. Device drivers may essentially comprise a number of files. For example, in DOS systems, drivers are files with a .SYS extension; in Windows environments, drivers often have a .DRV extension.

It will be appreciated that, when a new hardware device is to be added to a computer system, application programs resident on the computer system need not be modified and all that is required is a new device driver to interface the new hardware to the existing application programs.

SUMMARY

In accordance with the invention, there is provided a method and system to process digital image data (e.g., a digital video stream or stream) in a device driver.

In one exemplary embodiment, a method is provided of processing an Instant Message, the method comprising:
  receiving a captured image from an image capture device;
  selecting at least one image effect from a plurality of image effects;
  generating a modified image including the at least one image effect; and
  communicating the modified image to a viewing location as the Instant Message.

In one exemplary embodiment, the method is performed in a device driver to interface the image capture device to an Instant Messaging application associated with the device driver. The captured image may be a digital video stream.

The invention also extends to a machine-readable medium embodying a sequence of instructions that, when executed by a machine, cause the machine to execute any one or more of the method described herein or that is configured to implement any one or more of the systems described herein.

Other features of the present invention will be apparent from the accompanying exemplary drawings and description that follow.

BRIEF DESCRIPTION OF THE DRAWINGS

The invention is illustrated by way of example, and not limitation, in the figures of the accompanying drawings, in which like reference numerals indicate the same or similar features unless otherwise indicated.

In the drawings.

DETAILED DESCRIPTION

Figure 1:
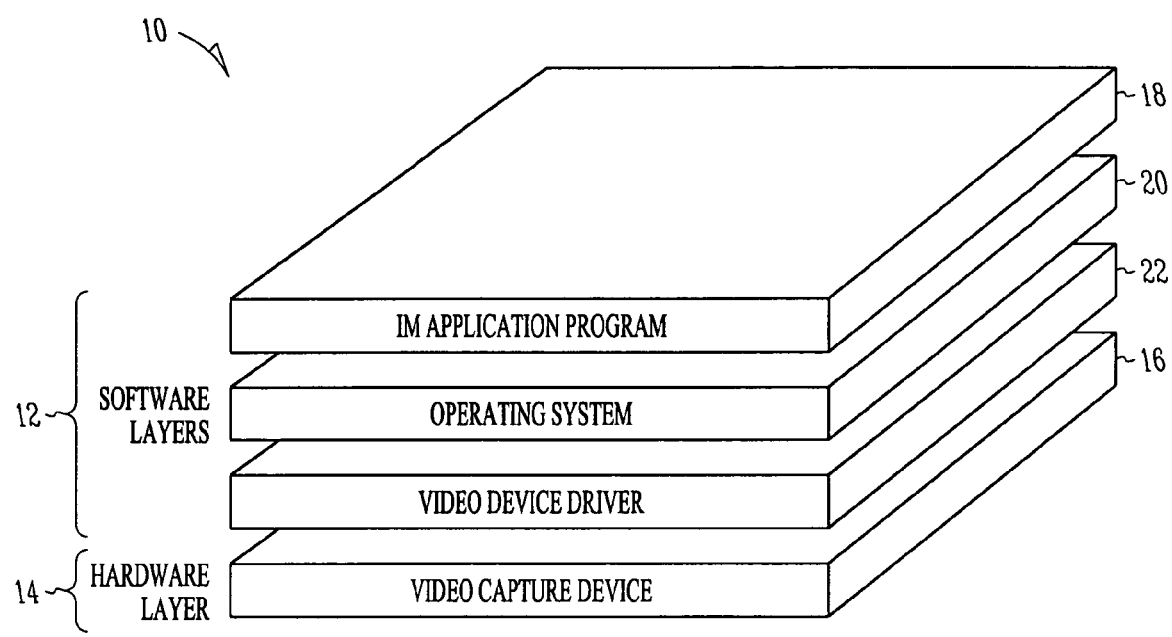
FIG. 1 shows a schematic block diagram of exemplary hardware and software layers in a computer system, in accordance with the invention.

A method and a system to process digital image data (e.g., a digital video image or stream) are described. In the following description, for purposes of explanation, numerous specific details are set forth in order to provide a thorough understanding of the present invention. It will be evident, however, to one skilled in the art that the present invention may be practiced without these specific details. The invention is described, by way of example, with reference to processing a digital video stream in a video Instant Messaging (IM) environment. It will, however, be appreciated that the invention can apply in any device driver environment and/or any digital data processing environment. Thus, the invention is not limited to video streams but may also find application in still images or digital photographs.

In one exemplary embodiment, a selected video effect is automatically added to a captured video stream prior to generate a modified video stream for communication to a display device located at a remote viewing location. Accordingly, in this example embodiment, no further effect processing of the video effect is required to display the modified video stream. As described in more detail below, the video effect may simulate a selected environment in which the video imaged are captured. For example, a particular capture location, weather condition, special effect, or the like may be simulated at the capture location. For example, a weather condition such as snow may be simulated by adding a snow effect to the captured image. In one exemplary embodiment, the video effect is a gimmick effect or fun effect that simulates a gimmicky video capture environment. In another exemplary embodiment, the video effect is an insertion of manually drawn figures, and/or stylised words, and/or a supplementary image(s), and/or predefined shapes that alters the appearance of the video capture screen. For the purposes of this specification the term "gimmick" is intended to include a trick effect, a fake or simulated environment, a fun effect, or the like. It is however to be appreciated that the effect is not limited to such effects. When the invention is applied in an IM environment, the simulated video effect may be added at either the capture location or at the viewing location.

In one exemplary or example embodiment, a video device driver is provided that can be deployed in an Instant Messaging (IM) environment. As well known to a person of skill in the art, Instant Messaging is a communication method that allows users to create a kind of private communication or chat room with one or more other another individuals. Communications may be text communications, voice communications and/or video communications which take place in real-time (or near real-time). Further, video and text IMs may take place using any communication network such as the Internet using any computer device (e.g., a personal computer (PC), Personal Digital Assistant (PDA) or the like), a cellular telephone network (e.g., using a cellular telephone) or any other communication network.

There are at present a variety of IM application programs available for downloading via the Internet that provide video and text instant messaging or conferencing. Examples of such application programs are Yahoo Instant Messenger, MSN Instant Messenger, and AIM (AOL Instant Messenger). These application programs allow users to video IM (video conference) using relatively inexpensive video capture devices such as web cameras. It will be appreciated that each of these exemplary IM application programs allows this functionality irrespective of the actual type of video capture device used (e.g., web camera or video camera). Each video capture device has an associated device driver to interface the specific capture device to any one of the different IM application programs. A change in the IM application program (e.g., a software upgrade) does not generally require any change in the device driver for the video capture device.

Device drivers generally act as translators between computer application programs (and computer operating systems), and virtually all hardware not on a computer's motherboard. In video IM application programs, the device driver of the video capture device acts as a translator between the IM application program (e.g., Yahoo Instant Messenger, MSN Instant Messenger, and AIM) and the video capture device.

Referring to the drawings, a computer system 10 is shown to include exemplary hardware and software layers 12, 14 respectively. The hardware layer 14 shows a video capture device 16 but it is to be appreciated that several other hardware devices (e.g. a printer, audio card, graphics card, CD reader/writer, DVD reader/writer or the like) may be provided. The software layers 12 are shown to include an IM application program 18, an operating system 20, and a video device driver 22, also in accordance with the invention, associated with the video capture device 16. As described in more detail below, in one embodiment, the video device driver 22 adds special effects on-the-fly to video images or streams captured by the video capture device 16.

The IM application program 18 may be any one of a plurality of different IM application programs (including legacy application programs) such as, Yahoo Instant Messenger, MSN Instant Messenger, AOL Instant Messenger, or the like. The operating system 20 may, for example, be a Windows-based operating system (e.g. Windows XP), a Unix system, Apple's Macintosh operating system, Linux, or any other operating system. In one exemplary embodiment, the system 10 communicates both video and text instant messages via the Internet. Accordingly, the video capture device 16 may be a web camera (e.g. a web camera available from Creative Labs Inc., Logitech, Labtech, D-Link or any other image capture device). It is, however, to be appreciated that the software layers 12 and hardware layer 14 of the system 10 are merely exemplary layers and, in different embodiments, one or more software layers 12 may be omitted or combined, and further software layers 12 may be provided. Likewise, multiple device drivers may be provided (e.g., for printers, audio cards, graphics cards etc.).

Figure 2:
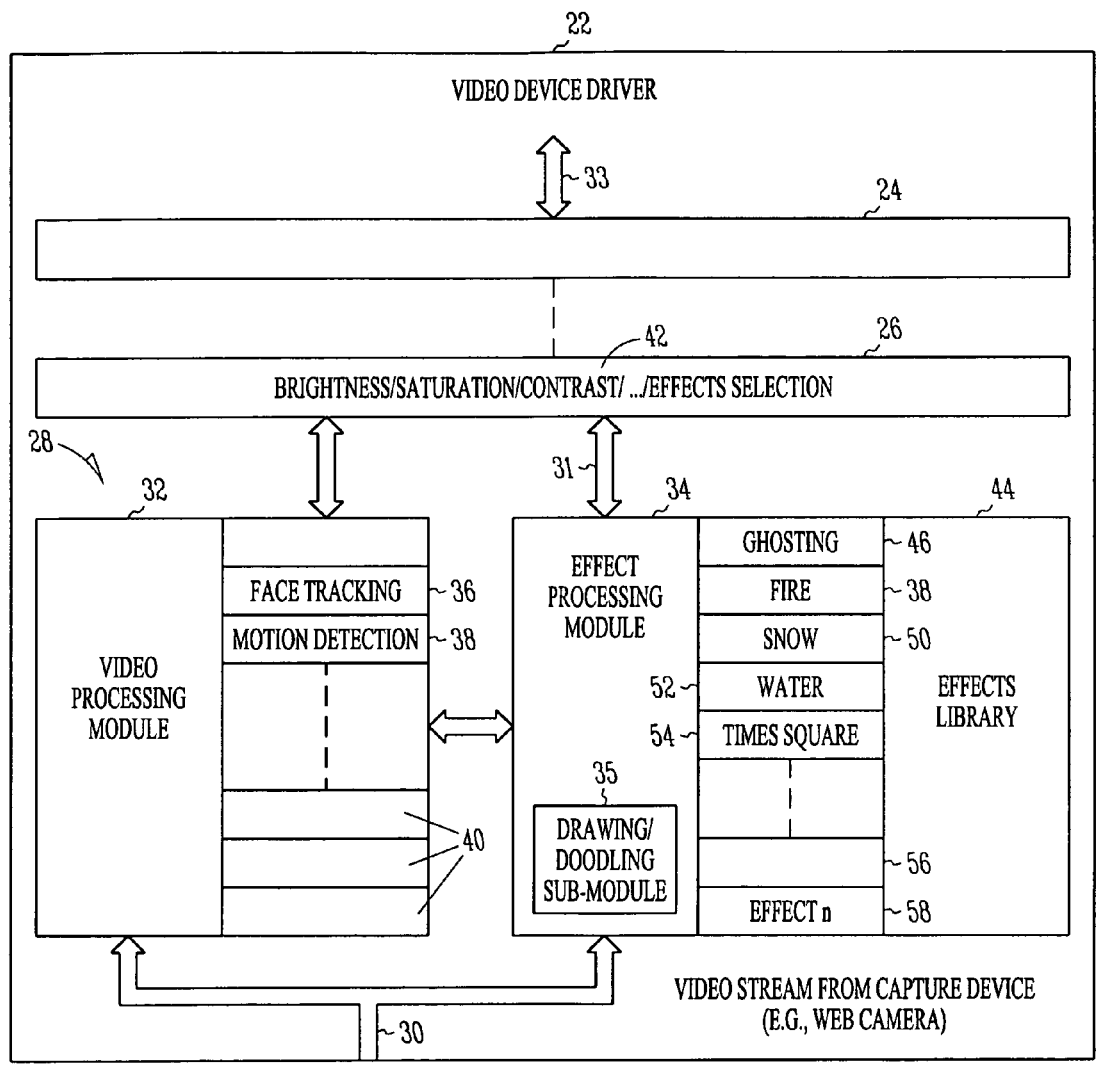
FIG. 2 shows a schematic block diagram of exemplary functional units of an embodiment of video device driver, in accordance with the invention, for processing a digital image.

The video device driver 22 may be a propriety device driver written by a manufacturer of the video capture device 16. As mentioned above, the video device driver 22 may act as a translator between the IM application program 18 and the video capture device 16 and may include a plurality of files (e.g. .dll files, .sys files, .drv files, or the like). The video device driver 22 is also shown to include various functional layers 24, 26, 28 (see FIG. 2). Each functional layer 24, 26, 28 may perform various operations on a video stream 30 received from the video capture device 16. In one exemplary embodiment, the video device driver 22 includes two exemplary processing modules, namely, a video processing module 32 and an effect processing module 34. Although the processing modules 32, 34 are shown as separate modules, it will be appreciated that their functionality may be integrated into a single module and, accordingly, the modules 32 and 34 may thus form an integrated software unit. However, it will be appreciated that the modules can also be separate functional modules or software units located within the video device driver 22. In one exemplary embodiment, the effect processing module 34 defines a virtual driver operating in conjunction with the IM application program 18 and video processing module 32 which may include a conventional webcam device driver.

In one exemplary embodiment, the video processing module 32 includes a hardware interface module that interfaces with a video capture device, and the effects processing module 34 may define a selection module that selects a filter for use in filtering the captured video image thereby to introduce a special effect.

The video processing module 32 may include conventional video processing functionality (a plurality of driver files) to process a video stream received from a web camera. The video processing module 32 is shown, by way of example to include face tracking functionality 36, motion detection functionality 38, and a plurality of other functions 40 known to a person of ordinary skill in the art. However, unlike prior art video device drivers, the video device driver 22 includes effect processing functionality in the device driver itself that may, for example, be performed by the by the effect processing module 34. Accordingly, the video stream 30 received from the video capture device 16 is also fed into the effect processing module 34 which then takes the digital data and processes it to include one or more selected effects.

In one exemplary embodiment, the effect processing is performed in real-time and on-the-fly and a processed video stream 31 is then feed, for example, into the functional layer 26. The functional layer 26 may include functions commonly used in web camera device drivers such as, for example, brightness adjustment, saturation adjustment, contrast adjustment, and so on. However, in addition to the aforementioned controls, the functional layer 26 may also allow effects selection functionality 42. The effects selection functionality 42, allows the IM application program 18 (e.g. Yahoo IM) to interact with the video device driver 22 so that a user can define the effect included in the video stream 30. One or more further functional layers may be provided to process the captured video stream which is then fed as a processed or modified video stream 33 to the IM application program 18.

It will be noted that in the exemplary embodiment illustrated, the effect is introduced into the video stream in the video device driver 22 itself and not in the IM application program 18 or any other application program on the computer system 10. Accordingly, the processing of the video stream 30 to include the effects is not dependent on the specific IM application program running on the system 10. For example, in the event of the IM application program 18 being updated or changed, the effect processing functionality is not affected.

In addition, the effect processing module 34 may also include a drawing/doodling sub-module 35 that allows for manually drawn figures and/or stylized words and/or supplementary images to be added to the video stream 30 prior to the video stream being received by the IM application program 18. The addition of such effects alters the appearance of the video capture screen.

The effect processing module 34 may include a plurality of different effects provided in an effects library 44. The effect library 44 is shown, by way of example, to include a ghosting effect 46, a fire effect 48, a snow effect 50, a water effect 52, a Times Square effect 54, and a plurality of other effects 56. In use, as described in more detail, a user may via the IM application program 18 select at least one effect from the effects library 44 which is then added to the video stream 30 prior to the video stream 30 being received by the IM application program 18. The video effect may thus simulate an environment at the image capture location.

In one exemplary embodiment, the effects library 44 includes a plurality of digital filters. For example, one digital filter may provide the ghosting effect 46, another digital filter may provide the fire effect 48, another digital filter may provide the snow effect 50, and so on. It will be appreciated that a variety of different effects may be created with different digital filters (e.g., defined in one or more driver files). Accordingly, in one exemplary embodiment, the effect processing module 34 uses one or more selected filters to filter the video stream 30 in the video device driver 22 thereby to introduce an effect in real-time or on-the-fly. The effects introduced may be humorous, trivial, or the like (gimmicky) to enhance/alter a video image received and seen by a remote viewer with whom the sender is instant messaging or video conferencing.

Figure 3:
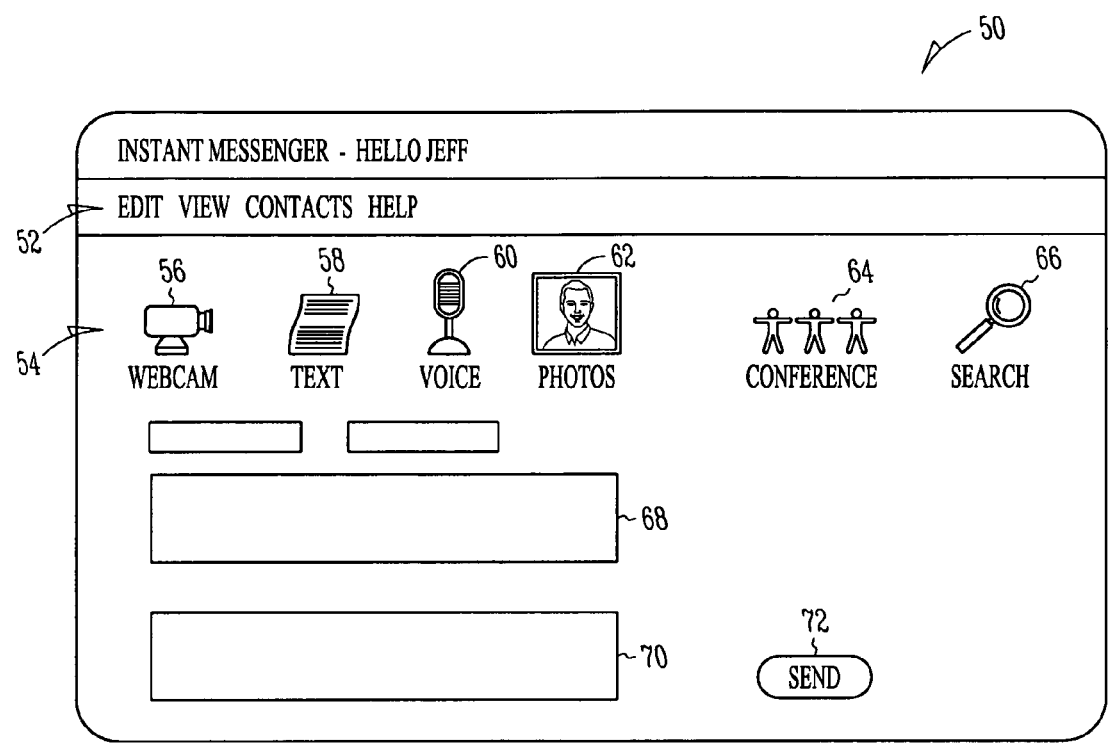
FIG. 3 shows an exemplary graphical user interface, in accordance with the invention, generated by an Instant Messaging (IM) application using the video device driver.

FIG. 3 shows an exemplary graphical user interface 50, in accordance to the invention, generated by the IM application program 18 in response to retrieving files provided in the video device driver 22. The GUI 50 includes a toolbar 52 allowing a user to perform edit functions, view functions, contacts functions, and help functions. The GUI 50 further includes radio buttons 54 allowing a user to select webcam IM 56, text IM 58, voice IM 60, photograph IM 62, conference IM 64, and perform search functionality 66. It will be appreciated that various other fields and radio buttons may be provided in different embodiments. It will be appreciated that the video effects may also be applied to still images such as the photographs IM 62.

Figure 4A:
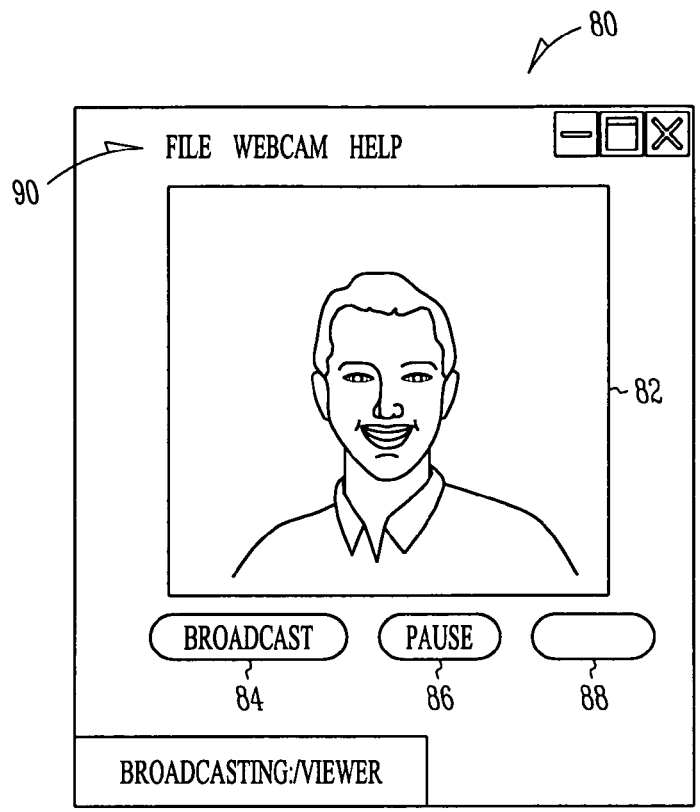
FIG. 4A shows an exemplary graphical user interface for displaying an image captured by a web camera without inclusion of any special effects.
Figure 4B:
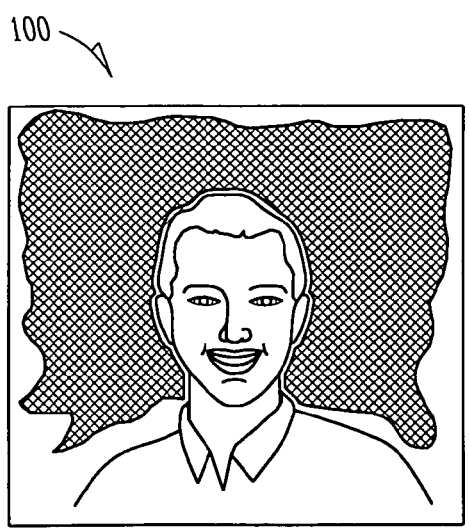
FIG. 4B shows an exemplary image, in accordance with the invention, sent via a computer network to a remote viewer including a special effect added by the video device driver.
Figure 4C:
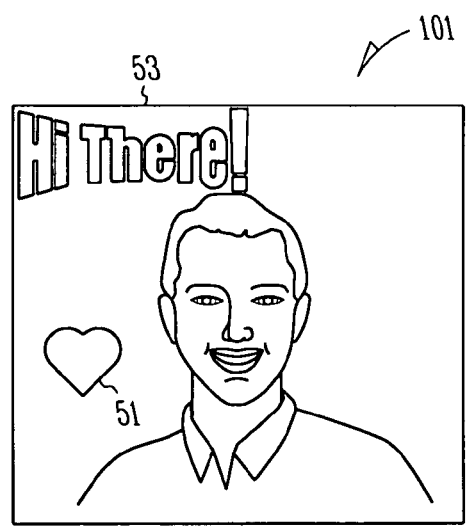
FIG. 4C shows an exemplary image, in accordance with the invention, sent via a computer network to a remote viewer including an insertion of an effect by a drawing/doodling sub-module added by the video device driver.

The exemplary GUI 50 includes a text entry field 68, a sent text field 70, and a send button 72. For example, in the event of a user desiring to commence a video IM session, a user may use a pointing device such as a mouse to select webcam IM 56 to initiate a session. In response thereto, an exemplary graphical user interface 80 (see FIG. 4A) may display an image captured by the video capture device 16 in a display window 82. As in the case of conventional video IM, the GUI 80 allows a user to broadcast a video stream by activating a broadcast button 84; pause a broadcast using a pause button 86; or provide related functionality using an exemplary button 88. The GUI 80 also includes a toolbar 90 to allow a user to perform conventional IM functionality. FIG. 4B shows an exemplary processed or modified video stream or image 100 including one or more special effects (e.g. a snow effect 50) that has been added to the video stream 30 received by the device driver 22. In a further example, FIG. 4C shows an exemplary processed or modified video stream or image 101 including one or more drawing/doodling imprints such as, for example, a hand-drawn heart 51 and stylized text 53, that have been added to the video stream 30 received by the device driver 22. Thus, a person participating in a video IM session sees the image captured by the video capture device 16 including special effects that have been included on-the-fly. In an example embodiment, special effects may be added to an image itself. For example, conversing parties using the IM application program 18 may add effects to the images. For example, when a webcam is trained on a first user's face, the IM application program 18 may allow a second user to add whiskers/stubble (or any other effects) to the first user's face (and thus the image received from the first user). The modified image may then be communicated to the first user so that the effects are visible to the first user. In an example embodiment, the effects added by the second user may be visible to the first user in real-time. It will be appreciated that the effects added to the image may be derived from a library of effects or be created by the second user on-the-fly.

Figure 5:
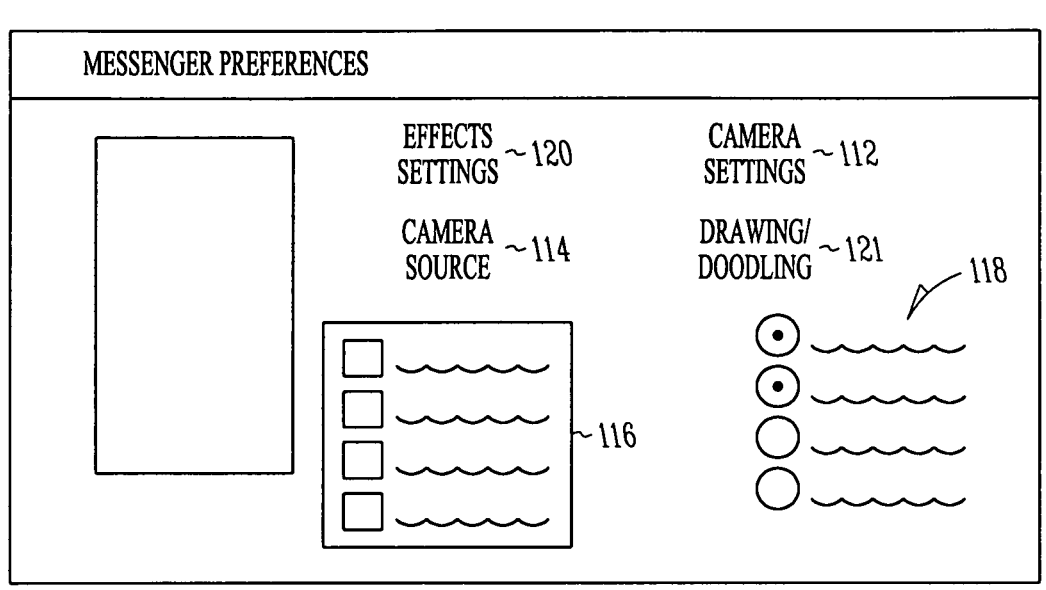
FIG. 5 shows an exemplary graphical user interface, in accordance with the invention, generated by an Instant Messaging application to allow a user to select IM preferences.

In order to allow a user to select different effects provided by the video device driver 22, the IM application program 18 provides a IM preferences graphical user interface 110 (see FIG. 5). Typically, in conventional IM application programs such as Yahoo Instant Messenger, MSN Instant Messenger, AIM, or the like, when a user selects a preferences or advanced tab, the IM application program 18 retrieves particular advanced details from the video device driver 22. For example, the video device driver 22 may include one or more files that the IM application program 18 retrieves to generate advanced or messenger preferences display screens. An example of such a display screen or GUI is the GUI 110. The GUI 110 is shown to include an exemplary camera settings button 112, a camera source button 114, and various other check boxes 116 and radio buttons 118 that allow a user to define advanced or user preferences. However, in addition to the aforementioned, the GUI 110 includes an effects settings button 120 and drawing/doodling function button 121 in accordance to the invention. The effects setting button 120 and drawing/doodling function button 121, as described in more detail below, allows a user to select one or more special effects provided by the video device driver 22 which are then included in the video stream 30 received from the video capture device (e.g. the web camera).

Figure 6A:
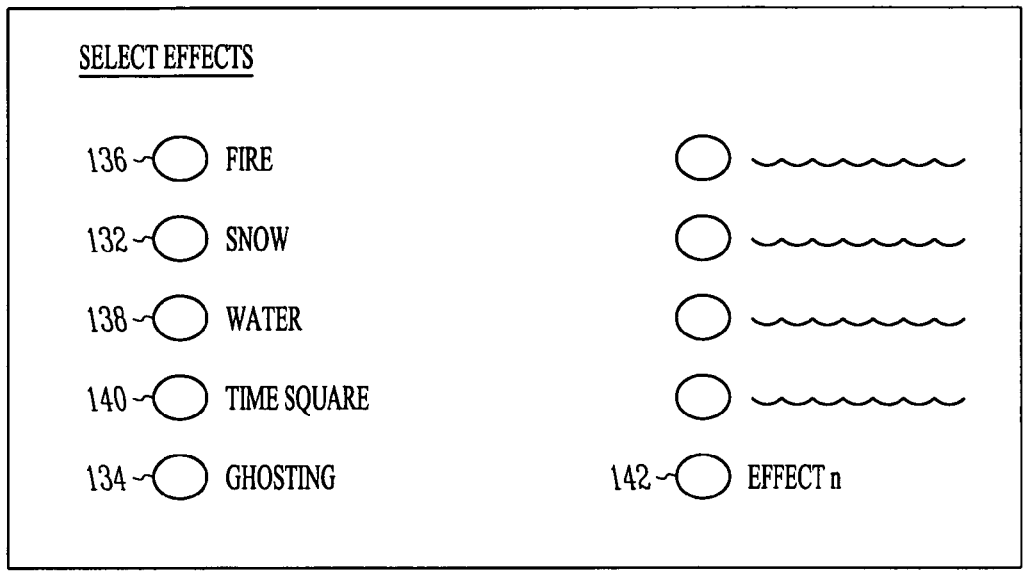
FIG. 6A shows an exemplary graphical user interface, in accordance with the invention, generated by an instant messaging application to allow a user to select a particular special effect.

FIG. 6A shows an exemplary graphical user interface 130, which is presented to user upon selection (e.g., a mouse click) of the effect settings button 120 of the GUI 110 (see FIG. 5). The various video effects that may optionally be selected by the user using the GUI 130 correspond to those provided in the effects library 44 of the video device driver 22. For example, in order to include the snow effect in the image 100 (see FIG. 4B) a user would select a snow button 132, which would then be set as the requested effect in the effect processing module 34. Accordingly, in one exemplary embodiment, the effect processing module 34 would then utilize a digital filter provided in the video device driver 22 to create or include a snow effect into the video stream 30 which is then communicated to the IM application program 18 as shown by arrow 33 in FIG. 2. Exemplary buttons 134, 136, 138, 140, 142 allow a user to instruct the effects processing module 34 to include the ghosting effect 46, the fire effect 48, the water effect 52, the Times Square effect 54 and other effects 56 respectively. It will be noted that, as the effect functionality may be selected using an advanced or preferences menu in a conventional IM application program, no software changes are required to conventional or legacy IM application programs in order to allow them to include the functionality provided by the video device driver 22.

Figure 6B:
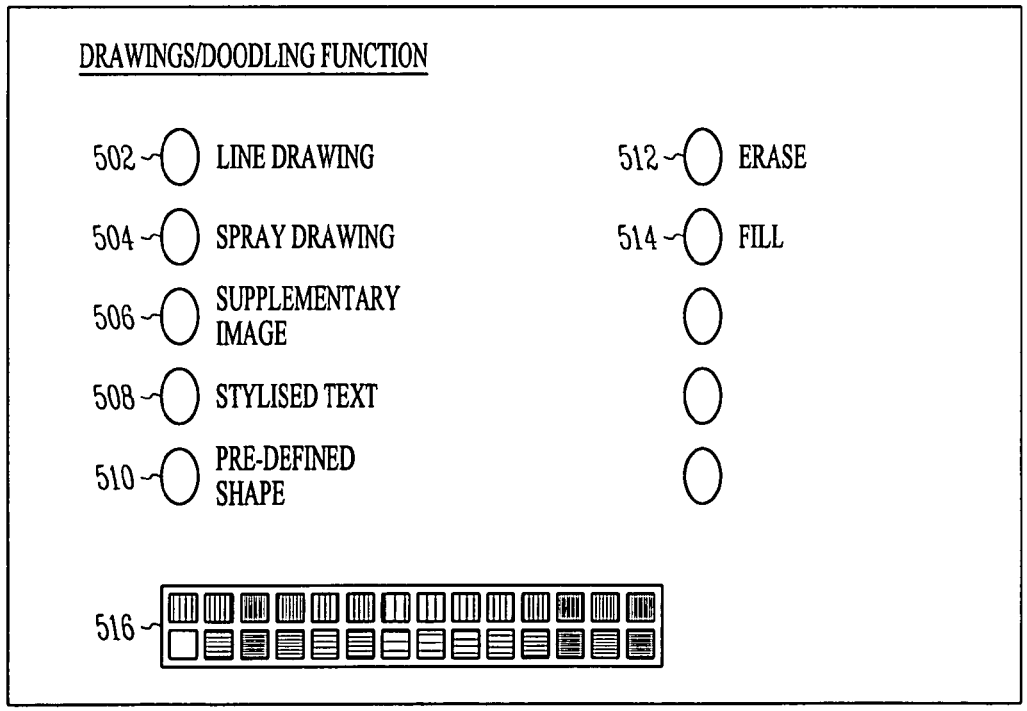
FIG. 6B shows an exemplary graphical user interface, in accordance with the invention, generated by an instant messaging application to allow a user to select a particular effect by a drawing/doodling sub-module.

FIG. 6B shows an exemplary graphical user interface 500, which is presented to user upon selection (e.g., a mouse click) of the drawing/doodling function button 121 of the GUI 110 (see FIG. 5). For example, in order to include the hand drawn heart 51 in the image 101 (see FIG. 4C) a user would select a line-drawing button 502, which would then be set as the requested effect in the effect processing module 34. Accordingly, in one exemplary embodiment, the effect processing module 34 would then utilize a digital filter provided in the video device driver 22 to create or include the hand drawn heart 51 into the video stream 30 which is then communicated to the IM application program 18 as shown by arrow 33 in FIG. 2. Exemplary buttons 504, 506, 508, 510, 512, 514 allow a user to instruct the effects processing module 34 to include the spray drawings, supplementary images, stylised text, predefined shapes, an erasing function and a fill function respectively. In the exemplary embodiment, a colour palette 516 may be utilised by a user to select line/spray/fill colours. Thickness of the lines and spray may be defined by the user. Selecting button 506 may activate a gallery of supplementary images for the user to select a supplementary image, or the user may be able to select a specific image file to be incorporated into the image 101. Supplementary images may be, for example, stars, hearts, cakes, animals, smileys and so forth. Selecting button 508 may activate another menu for selecting a font type and font size to be used. Selecting button 510 may allow the user to select pre-selected common shapes like stars, triangles, squares, pentagons and so forth to be incorporated into the image 101. It will be noted that, as the effect functionality may be selected using an advanced or preferences menu in a conventional IM application program, no software changes are required to conventional or legacy IM application programs in order to allow them to include the functionality provided by the video device driver 22.

Figure 7:
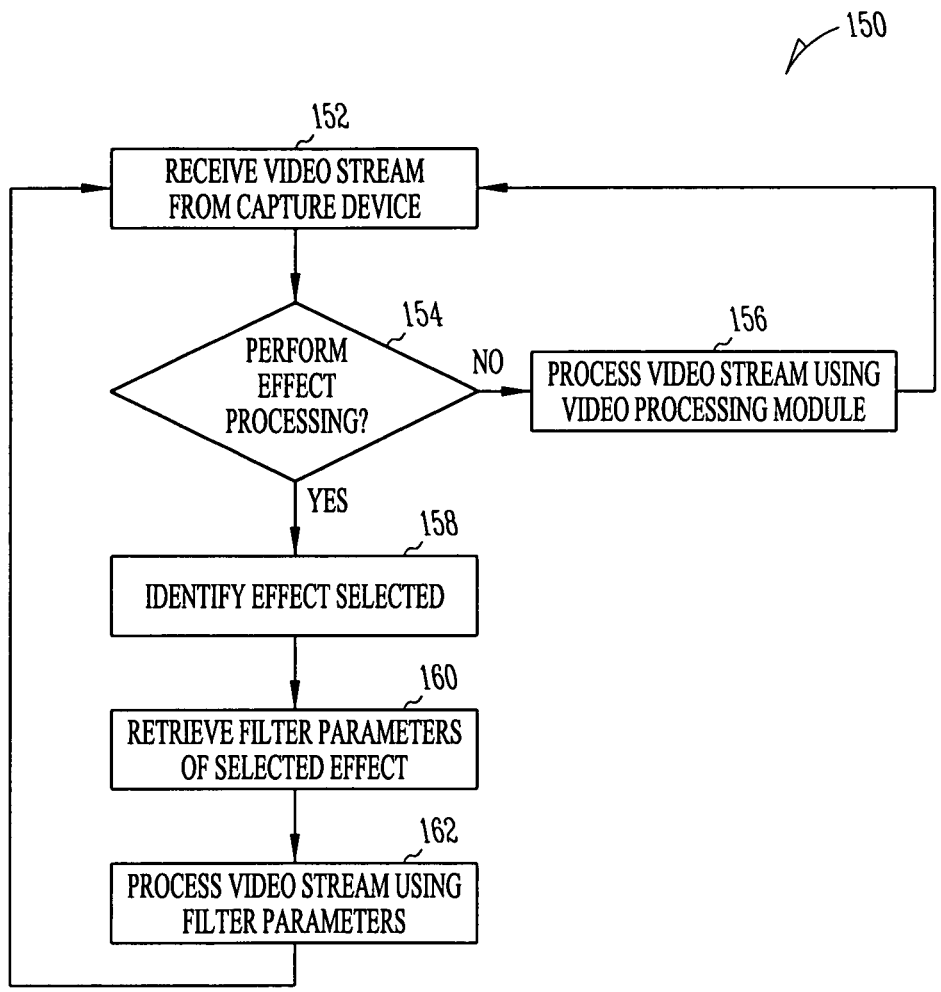
FIG. 7 shows a schematic flow diagram of a method, in accordance with the invention, of processing a video instant message in a device driver.

In FIG. 7, reference numeral 150 shows a schematic flow diagram of an image processing method, in accordance with the invention, performed in a device driver such as the device driver 22. Although the method 150 is described with reference to the device driver 22, it will be appreciated that the method may be deployed in any device driver that interfaces an image capture device (both still and video images) to any application program.

As shown at operation 152, the method 150 receives a video stream 30 from an image such as the video capture device 16. Thereafter, at decision operation 154, a determination is made as to whether or not one or more effects is to be included or added to the video stream 30. If no effects are to be added, then the method may perform conventional processing functionality on the video stream as shown at operation 156 and return to operation 152. It should be noted that effects include the insertions using the drawing/doodling submodule 35.

However, if inclusion of an effect has been selected, then the method 150 proceeds to operation 158 where the selected effect is identified. When the selected effect is achieved using one or more digital filters, the method 150 at operation retrieves filter parameters for the selected effect (see operation 160). The filter parameters for the selected effect may be provided by one or more files of the device driver 16. As shown at operation 162, the video stream 30 is then processed using the selected filter by, for example, the effect processing module 34.

It will be appreciated that the method 150 may perform both effect processing (see operations 158-162) and conventional processing functionality (see operation 156) on the video stream 30. Further, the effect processing and conventional processing functionality may be performed in any order.

It will however be appreciated each filter for generating an associated special effect may have a different transfer function and that the above transfer function is merely an example of such a function.

Figure 8:
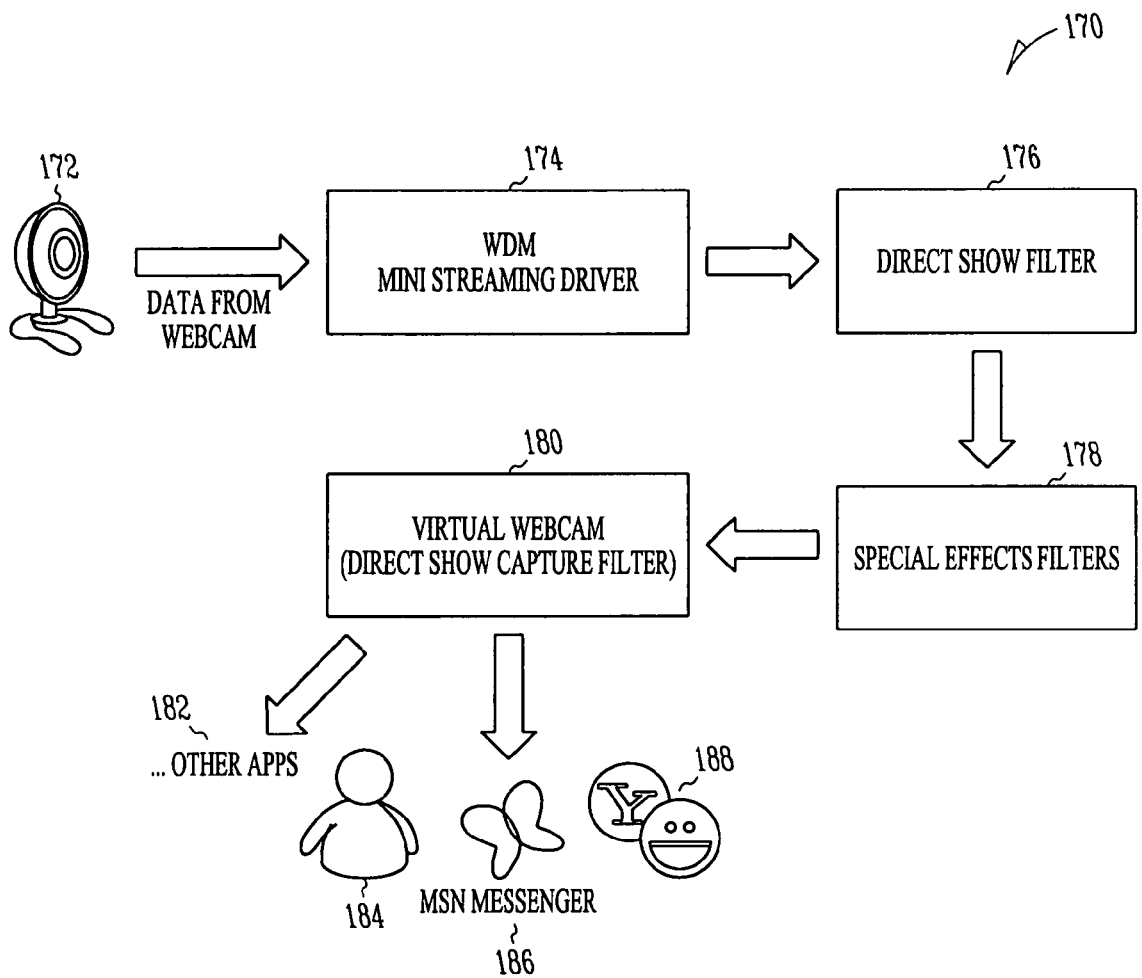
FIG. 8 shows an exemplary Internet-based video Instant Messaging system, in accordance with an embodiment of the invention.

FIG. 8 shows an exemplary Internet-based video instant messaging system 170, in accordance with an embodiment of the invention. The system 170 includes a web camera 172 captures an image and communicates image data to a mini streaming driver 174 (e.g., a Windows Driver Model (WDM)) which, in the exemplary embodiment, communicates video data to a DirectShow filter 176. Video data output by the DirectShow filter 176 is fed to a plurality of special effects filters 178. The special effects filters 178 may introduce a special effect as describes above. Once a selected special effect has been introduced into the captured image, the video data is then fed to a virtual webcam module 180 which, for example, communicates the video stream including one or more special effects to one or more other applications 182, an AOL IM application 184, an MSN IM application 186, a Yahoo IM application 188, or any other application.

Figure 9:
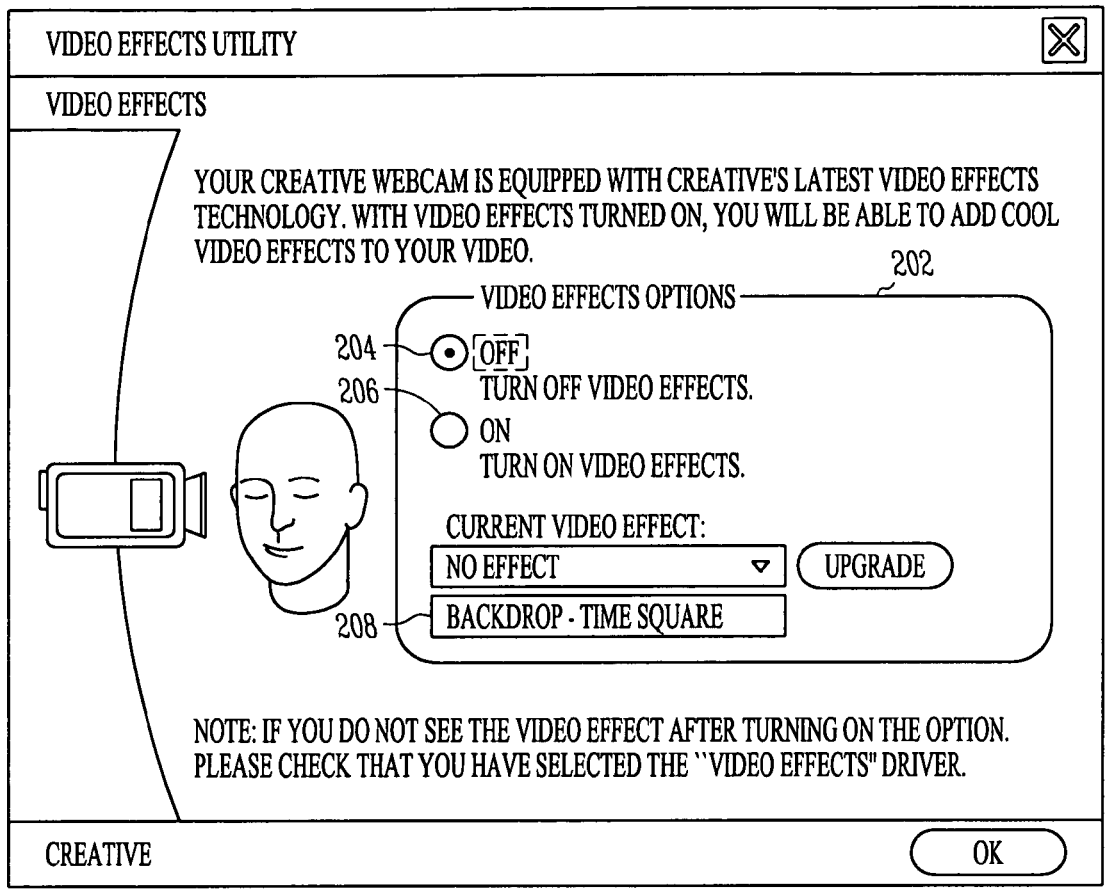
FIG. 9 shows an exemplary graphical user interface, in accordance with the invention, generated by system of FIG. 8.
Figure 10:
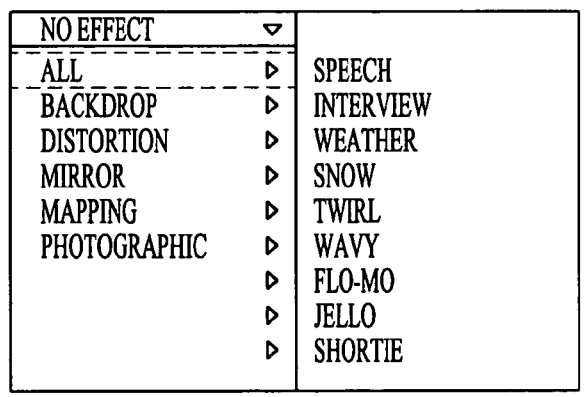
FIG. 10 shows an exemplary alternate drop-down menu of the graphical user interface of FIG. 9.

FIG. 9 shows an example graphical user interface 200 generated by the system 170. The GUI 200 includes a Video Effects Options pane 202 that provides a "Off" radio button 204 to allow a user capturing video at a capture location to disable inclusion of any video effects in a video IM. An "On" radio button 206 allows a user to enable one or more video effects. Selection of one or more video effects may be accomplished using a drop-down menu 208. Although the drop-down menu 208 shows only one exemplary video effect (Backdrop-Time Square), it will be appreciated that any number of video effect options may be provided in the menu as shown, by way of example, in FIG. 10. Further, the GUI 200 may include an upgrade button 210 to retrieve further video effects which may, for example, then be downloaded via an Internet connection.

In one exemplary embodiment, the video device driver 22 is a USB driver (e.g., USB 1.1 or USB 2.0), a Firewire driver (IEEE 1394), or any other driver using any other communication protocol. It will also be appreciated that the effect functionality of video device driver may be included in a cellular telephone or any other mobile device capable of capturing images both still and moving. In certain embodiments, the modified image may be encrypted.

Figure 11:
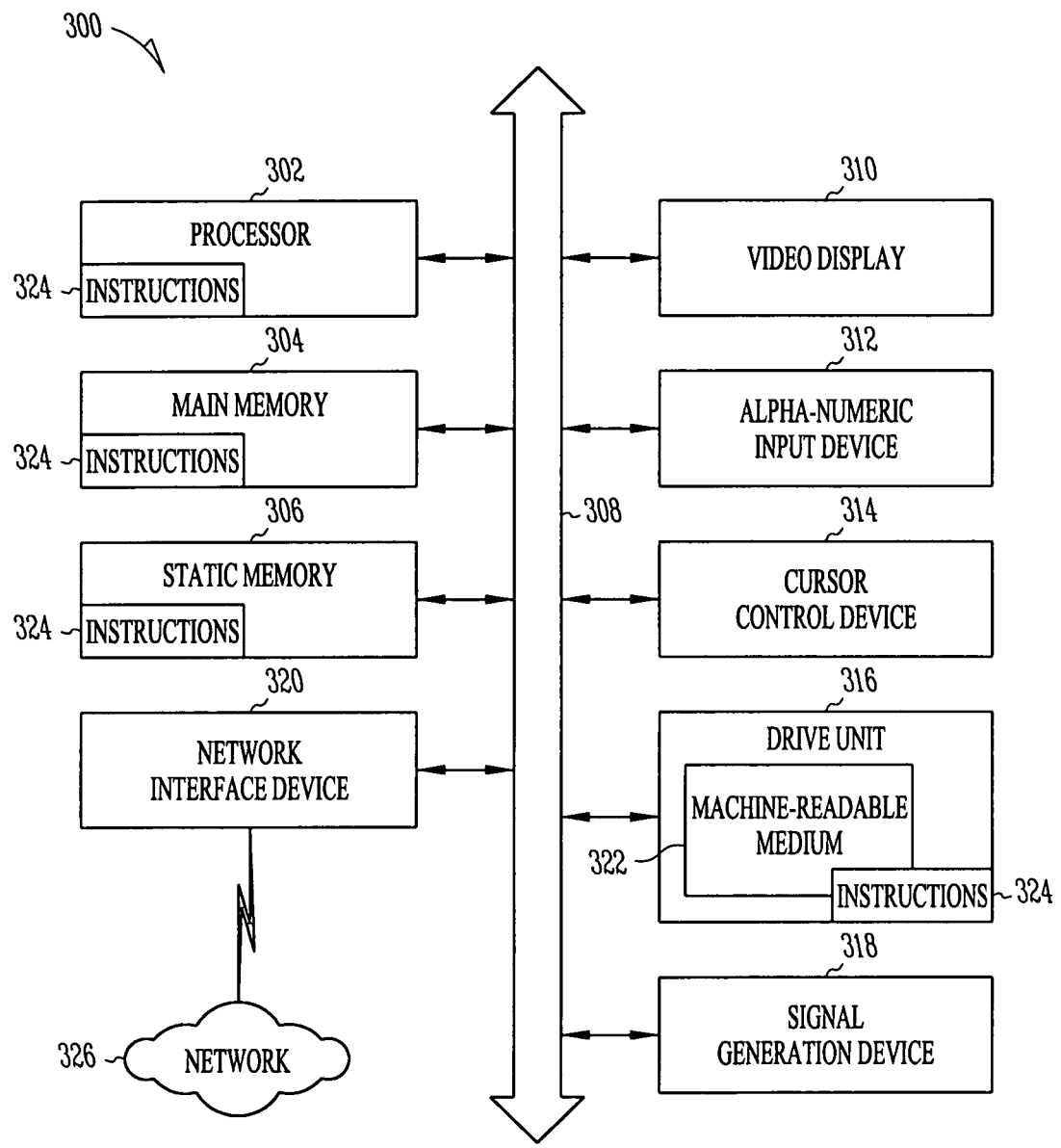
FIG. 11 shows a diagrammatic representation of machine in the exemplary form of the computer system within which a set of instructions, for causing the machine to perform any one of the methodologies discussed herein, may be executed.

FIG. 11 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320.

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to process digital images such as a video stream have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method performed by a device driver to process a video Instant Message, the method comprising:
   receiving a captured image from an image capture device;
   selecting at least one video effect from a plurality of video effects;
   generating a modified image by applying the at least one video effect to the captured image; and
   communicating the modified image to a viewing location as the video Instant Message,
   wherein the modified image is generated so that no further video effect processing of the video effect by the device driver is required to display the modified image.

2. The method of claim 1, wherein the captured image is a video stream.

3. The method of claim 2, which comprises generating a graphic user interface via an Instant Messaging application to allow a user to select the at least one video effect from the plurality of video effects.

4. The method of claim 2, which comprises receiving the captured video stream from a web camera and communicating the modified stream as a modified video stream via the Internet to the viewing location.

5. The method of claim 4, which comprises adding additional video effects to the captured video stream at the viewing location and re-transmitting the captured video stream with additional video effects to the user.

6. The method of claim 4, which comprises adding additional video effects to the plurality of video effects with a download facility.

7. A method of processing an Instant Message, the method comprising:
   receiving a captured image from an image capture device;
   selecting at least one image effect from a plurality of image effects;
   generating a modified image by applying the at least one image effectto the captured image;
   communicating the modified image to a viewing location as the Instant Message; and
   generating a graphic user interface via an Instant Messaging application to allow a user to select the at least one video effect from the plurality of video effects,
   wherein the captured image is a video stream and the at least one image effect is a video effect selected from a plurality of video effects, and
   wherein the method is performed in a device driver to interface the image capture device to an Instant Messaging application associated with the device driver.

8. The method of claim 7, wherein the device driver is configured to communicate with an Instant Messaging application.

9. The method of claim 7, wherein the device driver comprises the plurality of video effects, each video effect being selectable via the Instant Messaging application associated with the device driver.

10. The method of claim 2, wherein the video effect is a gimmick effect to simulate an environment at an image capture location.

11. The method of claim 2, wherein the video effect is the incorporation of at least one object to alter the appearance of the captured image, wherein the object is selected from the group comprising: drawings, supplementary images, pre-defined shapes, and stylised text.

12. The method of claim 2, wherein generating the modified video stream comprises processing the captured image with a filter corresponding to the at least one video effect selected.

13. The method of claim 12, wherein a plurality of digital filters are provided at the capture location that generate the plurality of video effects, the method comprising:
selecting one of the plurality of digital filters thereby selecting the at least one video effect; and
filtering the captured image with the selected digital filter to provide the modified video stream.

14. The method of claim 2, wherein the video Instant Message is generated by an Instant Messaging application, the method comprising adding the at least one special effect to the captured video stream prior to communicating the captured video stream to the Instant Messaging application.

15. A machine-readable medium having instructions stored thereon that, when executed by a device driver, cause the device driver to:
receive a captured image from an image capture device;
select at least one video effect from a plurality of video effects;
generate a modified image by applying the at least one video effect to the captured image; and
communicate the modified image to a viewing location as a video Instant Message,
wherein the modified image is generated so that no further video effect processing of the video effect by the device driver is required to display the modified image.

16. An image processing system to process a video Instant Message, the system comprising:
a computerized image processing system having a processor,
a hardware interface module to receive a captured image from an image capture device;
a selection module to select at least one video effect from a plurality of video effects; and
a processing module of a device driver to generate a modified image by applying the at least one video effect to the captured image, the modified image being for communication to a viewing location as the video Instant Message,
wherein the modified image is generated so that no further video effect processing of the video effect by the device driver is required to display the modified image.

17. The system of claim 16, wherein the captured image is a video stream.

18. The system of claim 17, wherein the processing module communicates the modified video stream to an Instant Messaging application which generates a graphic user interface to allow a user to select the at least one video effect from the plurality of video effects.

19. An image processing system to process an Instant Message, the system comprising:
a hardware interface module to receive a captured image from an image capture device;
a selection module to select at least one image effect from a plurality of image effects; and
a processing module to generate a modified image by applying the at least one image effect to the captured image, the modified image being for communication to a viewing location as the Instant Message, wherein the captured image is a video stream and the at least one image effect is a video effect selected from a plurality of video effects, and
wherein the processing module is provided in a device driver to interface the image capture device to an Instant Messaging application associated with the device driver.

20. The system of claim 19, wherein the device driver comprises the plurality of special effects, each special effect being selectable via the Instant Messaging application associated with the device driver.

21. The system of claim 17, wherein the video effect is a gimmick effect to simulate an environment at an image capture location.

22. The system of claim 17, wherein the video effect is the incorporation of at least one object to alter the appearance of the captured image, wherein the object is selected from the group comprising: drawings, supplementary images, pre-defined shapes, and stylised text.

23. The system of claim 17, which comprises a plurality of digital filters each corresponding to a selectable video effect, wherein the processing module filters the captured image with a digital filter corresponding to the at least one selected video effect to generate the modified video stream.

24. A processing system to process video Instant Message, the system comprising:
means for receiving a captured image from an image capture device;
means for selecting at least one video effect selected from a plurality of video effects;
means for generating a modified image by applying the at least one video effect to the captured image; and
means for communicating the modified image to a viewing location as the video Instant Message,
wherein the modified image is generated so that no further video effect processing of the video effect is required to display the modified image at the viewing location.

25. A method of processing a video stream, the method comprising:
capturing the video stream at a video capturing location;
prior to communicating the video stream to a viewing location,
generating a user interface providing a plurality of video effect options;
monitoring selection of at least one of the video effect options by a user;
processing the video stream to apply a video effect identified by the at least one video effect selected to the captured video stream to produce a modified video stream; and
communicating the modified video stream to the viewer location,
wherein the video stream is processed so that no further video effect processing of the modified video stream is required for displaying at the viewer location.

26. The method of claim 25, which comprises adding additional video effects to the modified video stream at the viewing location and re-transmitting the modified video stream with additional video effects to the user.

27. The method of claim 25, wherein the video effect is a gimmick effect to simulate an environment at an image capture location.

28. The method of claim 25, wherein the video effect is the incorporation of at least one object to alter the appearance of the captured image, wherein the object is selected from the group comprising: drawings, supplementary images, pre-defined shapes, and stylised text.

29. A method of processing a video stream, the method comprising:
- capturing the video stream at a video capturing location;
- prior to communicating the video stream to a viewing location,
- generating a user interface providing a plurality of video effect options;
- monitoring selection of at least one of the video effect options by a user;
- processing the video stream to apply a video effect identified by the at least one video effect selected to the captured video stream to produce a modified video stream; and
- communicating the modified video stream to the viewer location,
- wherein the method is performed in a device driver to interface the image capture device to an application associated with the device driver.

* * * * *